United States Patent [19]
Kato et al.

[11] Patent Number: 5,619,382
[45] Date of Patent: Apr. 8, 1997

[54] REFLECTION TYPE IMAGING OPTICAL SYSTEM

[75] Inventors: Mikiko Kato, Hachiouji; Yoshinori Iketaki, Oume, both of Japan

[73] Assignee: Olympus Optical Co., Ltd., Tokyo, Japan

[21] Appl. No.: 82,514

[22] Filed: Jun. 25, 1993

Related U.S. Application Data

[63] Continuation of Ser. No. 806,776, Dec. 12, 1991, abandoned, which is a continuation of Ser. No. 482,985, Feb. 22, 1990, abandoned.

[30] Foreign Application Priority Data

Feb. 23, 1989 [JP] Japan .................................. 1-044659

[51] Int. Cl.$^6$ ................ G02B 5/10; G02B 2/00
[52] U.S. Cl. .................. 359/858; 359/859; 359/366; 359/584; 378/84; 378/147
[58] Field of Search .................... 350/166, 618, 350/619, 620, 629; 378/84, 85, 745, 147; 359/366, 582, 584, 586, 587, 589, 731, 857, 858, 859, 868, 884

[56] References Cited

U.S. PATENT DOCUMENTS

| | | | |
|---|---|---|---|
| 4,026,641 | 5/1977 | Bosserman et al. | 350/629 |
| 4,318,089 | 3/1982 | Frankel et al. | 359/851 |
| 4,320,164 | 3/1982 | Nicolas et al. | 359/851 |
| 4,444,464 | 4/1984 | Minott | 350/172 |
| 4,497,540 | 2/1985 | Breckinridge et al. | 350/169 |

(List continued on next page.)

FOREIGN PATENT DOCUMENTS

| | | | |
|---|---|---|---|
| 1183285 | 2/1985 | Canada | 378/84 |
| 1420532 | 11/1965 | France | 350/629 |
| 59-151101 | 8/1984 | Japan | 350/630 |
| 0070802 | 3/1988 | Japan | 350/629 |
| 2210299 | 8/1990 | Japan | 359/884 |
| 2202963 | 10/1988 | United Kingdom | 350/166 |

OTHER PUBLICATIONS

Ream; "A Convex Beam Integrator"; Laser Focus, vol. 15; No. 11, Nov. 1979; pp. 68–72.

Barbee et al "Layered Synthetic Microstructures: Properties and Applications in X–Ray Astronomy"; SPIE vol. 184 Space Optics –Imaging X–Ray Optics Workshop (1979); pp. 123–130.

(List continued on next page.)

*Primary Examiner*—Ricky D. Shafer
*Attorney, Agent, or Firm*—Cushman, Darby & Cushman, IP Group of Pillsbury Madison & Sutro LLP

[57] ABSTRACT

A reflection type imaging optical system is provided with at least one reflecting mirror, whose reflecting surface is constructed of a plurality of zone areas different from each other in spectral reflectance characteristics. Further, in the optical system, the spectral reflectance characteristics of each zone area are selected so that an incident angle providing the maximum reflectance when a ray of light of a predetermined wavelength is incident on each zone area has a value between the maximum and the minimum of the incident angle in the zone area. The reflection type imaging optical system thus provides an important advantage in practical use in that the reflection efficiency of each reflecting surface is enhanced to bring about the brightness necessary for the imaging surface.

13 Claims, 6 Drawing Sheets

U.S. PATENT DOCUMENTS

| | | | |
|---|---|---|---|
| 4,695,139 | 9/1987 | Bagby et al. | 359/851 |
| 4,770,824 | 9/1988 | Blom | 359/851 |
| 4,790,654 | 12/1988 | Clarke | 356/310 |
| 4,798,446 | 1/1989 | Hettrick | 350/162.24 |
| 4,916,721 | 4/1990 | Carr et al. | 378/84 |
| 4,919,527 | 4/1990 | Saiylou et al. | 359/853 |
| 4,925,271 | 5/1990 | Taniura | 350/172 |
| 4,927,256 | 5/1990 | Lacuve | 350/619 |
| 4,941,163 | 7/1990 | Hoover | 378/84 |
| 4,964,706 | 10/1990 | Cook | 350/620 |
| 5,144,497 | 9/1992 | Kato et al. | 359/859 |

OTHER PUBLICATIONS

Underwood et al; "Layered Synthetic Microstructures as Bragg Diffractors For X Rays and Extreme Ultraviolet: Theory and Predicted Performance"; Applied Optics, vol. 20, No. 17, Sep. 1981 pp. 3027–3034.

Takeshi Namioka, Journal of the Japan Society of Precision Engineering, 52/11/1986, p. 1843.

Takeshi Namioka, Kagaku–Kenkyuhi Hojokin Kenkyu–Seika Hokokusho (1985).

Lawrence Mertz, Geometrical Design for Aspheric Reflecting Systems, Applied Optics/Dec. 15, 1979/vol. 18, No. 24 pp. 4182–4186.

B.L. Henke, P. Lee, T.J. Tanaka, R.L. Shimabukuro, and B.K. Fujikawa; Low–Energy X–Ray Interaction Coefficients: Photoabsorption, Scattering, and Reflection, Atomic Data and Nuclear Data Tables, vol. 27, No. 1,/ Jan. 1, 1982.

SCHWARZSCHILD TYPE

WALTER TYPE

IMAGE POINT

IMAGE POINT

IMAGE POINT

REFLECTION TYPE IMAGING OPTICAL SYSTEM

This is a continuation of application Ser. No. 07/806,776, filed on Dec. 12, 1991, abd which was abandoned upon the filing hereof; which was a continuation of Ser. No. 07/482,985 filed Feb. 22, 1990, now abandoned.

BACKGROUND OF THE INVENTION a) Field of the Invention

This invention relates to a reflection type imaging optical system suitable for image formation of light in an X-ray wave band.

b) Description of the Prior Art

As optical systems suitable for image formation of light in an X-ray wave band, a Schwarzshild type optical system combining a concave mirror having an aperture at its center portion with a convex mirror as shown in FIG. 1 and a Walter type optical system compounded of a hyperboloid of revolution and an ellipsoid of revolution as depicted in FIG. 2 are widely known, and some other optical systems are constructed from such three or more mirrors as in FIGS. 3A, 3B and 3C (refer to Appl. Opt. Vol. 18 No. 24, 4185, 1979).

X rays will undergo total reflection when a grazing angle is smaller than a certain angle with respect to various substances. Such an angle is termed a critical angle and depends on optical constants inherent in substances and on wavelengths of rays of light. When the grazing angle of a ray of light is larger than the critical angle, its reflectance will diminish rapidly in the range of wavelengths of an X-ray region. In such an instance, it is known as a provision for the improvement of the reflectance that a multilayer film is formed as lamination on a substrate to utilize the interference of light. The multilayer film has dispersion properties relying on an incident angle (namely, an angle made by the normal of a reflecting surface) of light and on a wavelength of incident light. In some of multilayer films, for example, as shown in FIG. 4A, a pair of layers are formed with two kinds of substances A, B, which are laminated on the substrate by the period of constant thickness. In this case, respective thicknesses $d_1$, $d_2$ of the substances A, B are optimized by Fresnel's recurrence formula (Takeshi Namioka, Journal of the Japan Society of Precision Engineering, 52/11/1986, P.1843) so that the reflectance is maximized when light having a wavelength $\lambda$ is incident on a film surface at an angle $\theta_0$.

In addition, another example, as depicted in FIG. 4B, shows a multilayer film having a non-periodic structure in which respective thicknesses $d_1$, $d_2$ of the substances A, B are not constant (Takeshi Namioka, Kagaku-kenkyuhi Hojokin Kenkyu-seika Hokokusho (1985)).

Where the reflection type imaging optical system is used for the image formation of light in the range of wavelengths of the X-ray region, it is necessary that the surface of a reflecting mirror is coated with the multilayer film to secure desired reflectance.

FIG. 5 is a diagram showing coordinate axes in evaluating the brightness of the reflection type imaging optical system comprising the reflecting mirror coated with the multilayer film and explaining the notation of various signs. In this diagram, a reflecting surface similar to the concave mirror of the Schwarzshild type optical system is shown and its optical axis is taken as a y axis, with an origin at an object point O, followed by an x-z plane normal to the y axis. Angles $\theta$, $\phi$ are plotted as in the diagram, the maximum and minimum values of the angle $\theta$ made by light rays capable of being incident on the imaging optical system, among those emanating from the object point O, are taken as $\theta_{max}$ and $\theta_{min}$, respectively, and an incident angle of light on a j-th reflecting surface from the object point side as $\theta_j$. In this case, the brightness at an image point I of the imaging optical system is defined, as total transmittance $\alpha$, by $$\alpha = Ie \cdot \int_{aperature} R_1 \cdot R_2 \cdot \ldots \cdot R_k \cdot \ldots \cdot R_N \cdot d\Omega \qquad (1)$$

$$= Ie \int_0^{2\pi} \int_{\theta min.}^{\theta max.} R_1 \cdot R_2 \cdot \ldots \cdot R_k \cdot \ldots \cdot R_N \cdot \sin\theta \cdot d\theta \cdot d\phi$$

where Ie:

the energy intensity of light emanating from the object point O which traverses a distance at a unit time per unit solid angle, $R_k$: the reflectance at a k-th reflecting surface, $\Omega$: the solid angle at the object point O subtended by an effective aperture of the optical system, $\theta$: an angle made by the light ray emanating from the object point O with the optical axis (y axis), $\phi$: an angle made by a projecting image, onto the x-z plane, of the light ray passing through the object point O with the z axis when the x and z axes are plotted perpendicular to the optical axis, and N: the number of reflecting surfaces contained in the imaging optical system.

The region of integration is assumed to be in the range (hatched portion) in which the light traverses the effective aperture of the optical system.

Formula (1) can be rewritten as follows:

$$\alpha = Ie \cdot \lim_{n\phi \to \infty} \lim_{n\theta \to \infty} \sum_{i=0}^{n\phi} \sum_{j=0}^{\frac{\theta_{max.}-\theta_{min.}}{\Delta\theta}} R_1 \cdot R_2 \cdot \ldots \cdot \qquad (2)$$

$$R_k \cdot \ldots \cdot R_N \cdot \sin\theta_j \cdot \Delta\theta \cdot \Delta\phi$$

$$= Ie \cdot 2\pi \cdot \lim_{n\theta \to \infty} \sum_{j=0}^{\frac{\theta_{max.}-\theta_{min.}}{\Delta\theta}} R_1 \cdot R_2 \cdot \ldots \cdot$$

$$R_k \cdot \ldots \cdot R_N \cdot \sin\theta_j \cdot \Delta\theta$$

Here, $\theta j : \theta \min + j \cdot \Delta\theta$, $\Delta\phi = 2\pi/n_\phi$, $\Delta\theta = 2\pi/n_\theta$ where j, $n_\phi$ and $n_\theta$ are integers.

As mentioned above, the multilayer film has dispersion properties relying on the wavelength and the incident angle. As such, unless the multilayer film is designed to coat each reflecting surface with consideration for these properties, sufficient reflectance cannot be derived from each reflecting surface and neither can the brightness (namely, the total transmittance $\alpha$) sufficient for an image surface to be secured. In the past, however, an optimized design of the multilayer film coating each reflecting surface has never been considered.

SUMMARY OF THE INVENTION

A primary object of the present invention is to provide a reflection type imaging optical system constructed so that a reflection efficiency of each reflecting surface is enhanced to bring about brightness sufficient for an imaging surface.

This object is achieved, according to the present invention, by the configuration that in a reflection type imaging optical system provided with at least one reflecting mirror, a reflecting surface of the reflecting mirror comprises a plurality of zone areas different from each other in spectral reflectance characteristics. In such an instance, a more favorable reflection type imaging optical system can be brought about by selecting the spectral reflectance characteristics of each zone area so that an incident angle providing the maximum reflectance when a ray of light having a predetermined wavelength is incident on each zone area has a value between the maximum and the minimum of the incident angle in the zone area.

According to the present invention, such a reflection type imaging optical system can be attained in the following manner.

FIG. 6 depicts schematically the reflecting surface of the reflecting mirror in order to illustrate the principle of the present invention. This reflecting surface, as shown in the figure, is divided into a plurality of zone areas arranged in order of 1, 2, . . . , l, l+1, . . . which are partitioned by concentric circle-like interfaces. Where the reflecting mirror is used in any of the reflection type imaging optical systems such as are shown in, for example, FIGS. 1 to 3c, an angle at which the light ray emanating from the object point not shown to reach the image point through the reflection type imaging optical system is incident on the reflecting surface will uniquely be determined and, for example, will take a value between the minimum $'\theta_{k\,min}$ at one interface a and the maximum $'\theta_{k\,max}$ at the other interface b in the l-th zone area. In the present invention the structure of a multilayer film provided on the reflecting surface is designed so that the incident angle at which the reflectance becomes maximum with respect to the light having a specific wavelength in each zone area takes a value $'\theta_k$ between the maximum and the minimum of the incident angle of the light entering the zone area. Since such a structure causes the reflectance in each zone area to be increased, the reflection efficiency of the entire reflecting surface is considerably raised so that an image with sufficient brightness can be secured.

Here, the incident angle of the light in each zone area approaches the value of the incident angle providing the maximum reflectance as the width of the zone area diminishes, and as such if the number of zones constituting the reflecting surface is increased, the reflection efficiency of the entire reflecting surface will further be improved. Since, however, the increase of the number of zones renders manufacturing difficult accordingly, it is generally good practice to select the number of zones with consideration for balance between them.

Further, where the reflection type imaging optical system is equipped with a plurality of reflecting mirrors in the present invention, it is possible to either render the zone areas of the reflecting surfaces of individual reflecting mirrors equivalent to or different from each other in number.

Also, the reflection type imaging optical system according to the present invention is preferably applied to the Schwarzschild type optical system.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1:
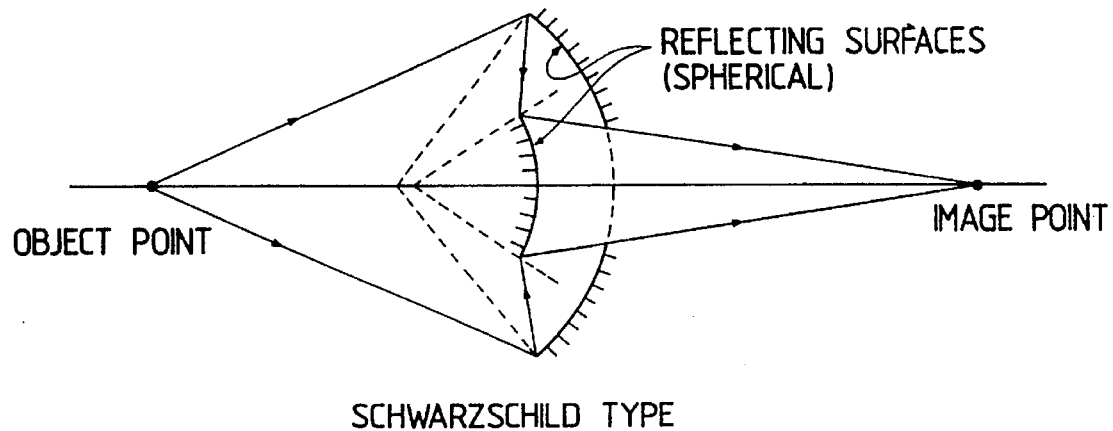
FIGS. 1 to 3c are basic structural views of various reflection type imaging optical systems.
Figure 2:
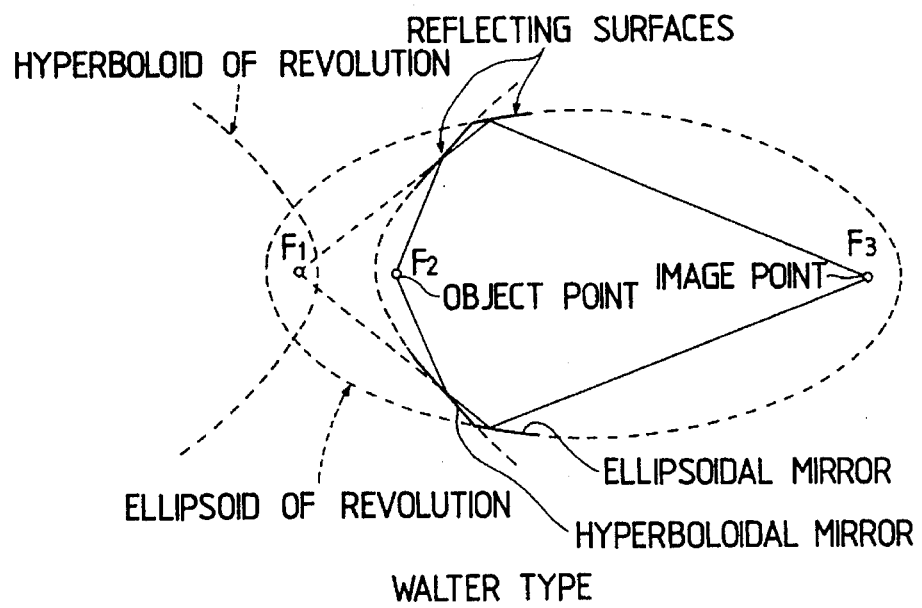
Figure 3A:
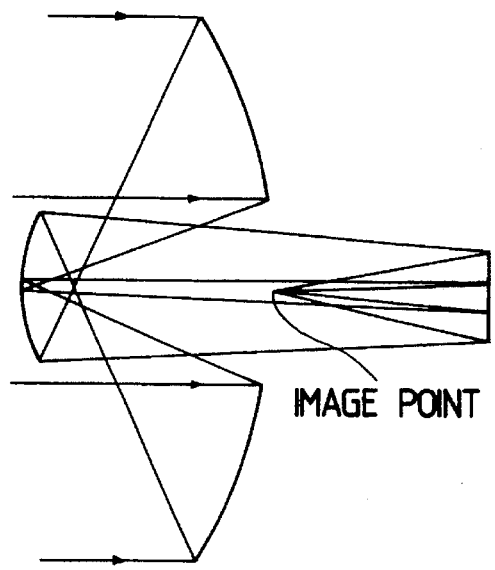
Figure 3B:
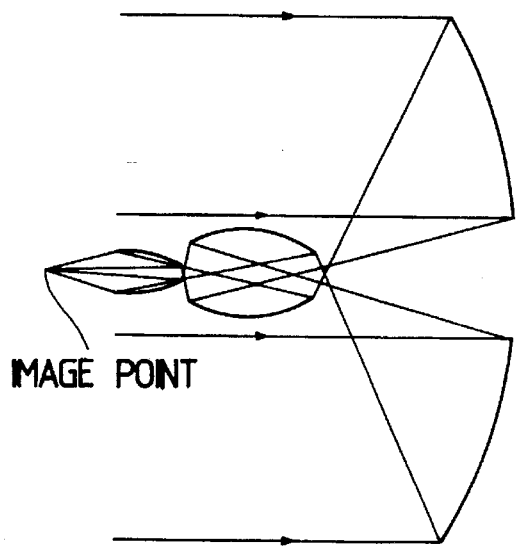
Figure 3C:
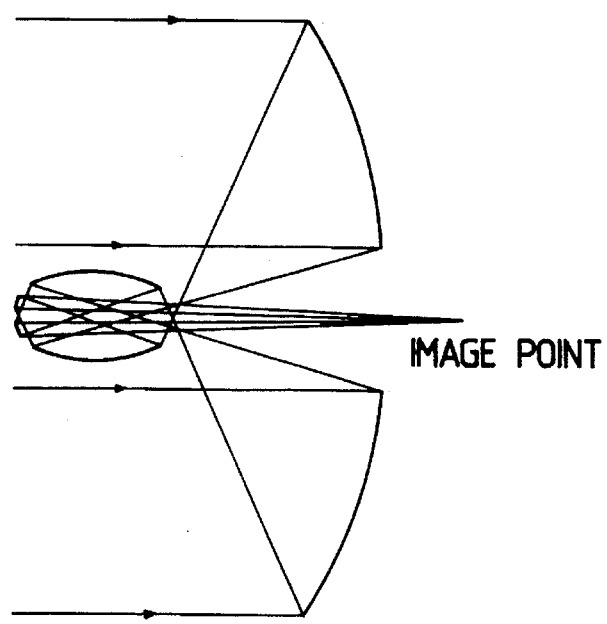

In accordance with the embodiments shown in the drawings, the present invention will be described in detail below.

Figure 7:
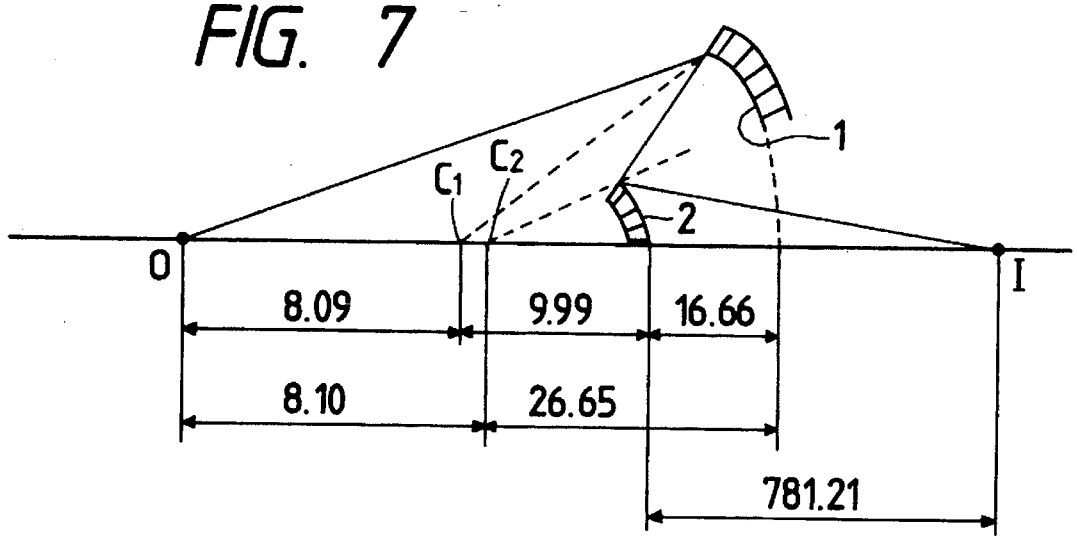
FIG. 7 is a view showing an example of a Schwarzschild type optical system.

FIG. 7 is a sectional view showing only the upper portion with respect to an optical axis of a Schwarzschild type optical system, in which reference symbols $C_1$ and $C_2$ represent centers of curvature of a concave mirror 1 and a convex mirror 2, respectively. This optical system is designed so that magnification m=100 and an object-side numerical aperture N.A.=0.207, in which numerical values designated in the figure represent mutual distances relating to the object point O, image point I, concave mirror 1, convex mirror 2, and centers of curvature $C_1$, $C_2$.

Where each reflecting surface of two reflecting mirrors of the Schwarzschild type optical system is coated with the following multilayer film, a description will now be given, referring to embodiments, as to how the thickness of each layer should be determined when each reflecting surface is divided into a plurality of zones.

Also, in each embodiment, formula (2) is used for the calculation of the total transmittance α and approximates as $n_\phi$=99 and $n_\theta$=999.

Multilayer film

Figure 4A:
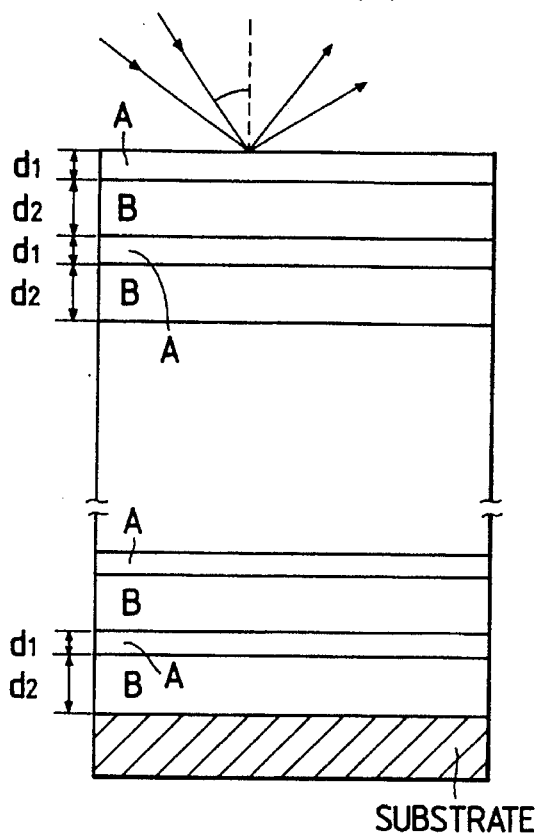
FIGS. 4A and 4B are schematic sectional views of reflecting mirrors having multilayer films.
Figure 4B:
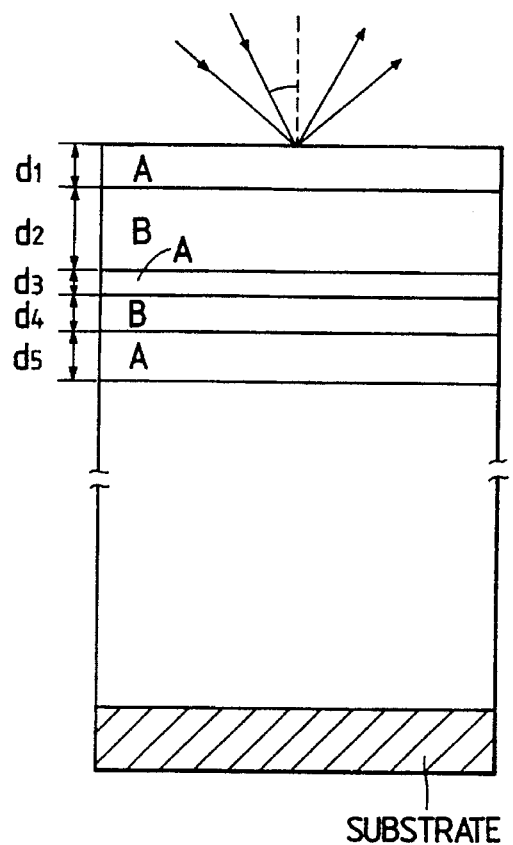
Figure 5:
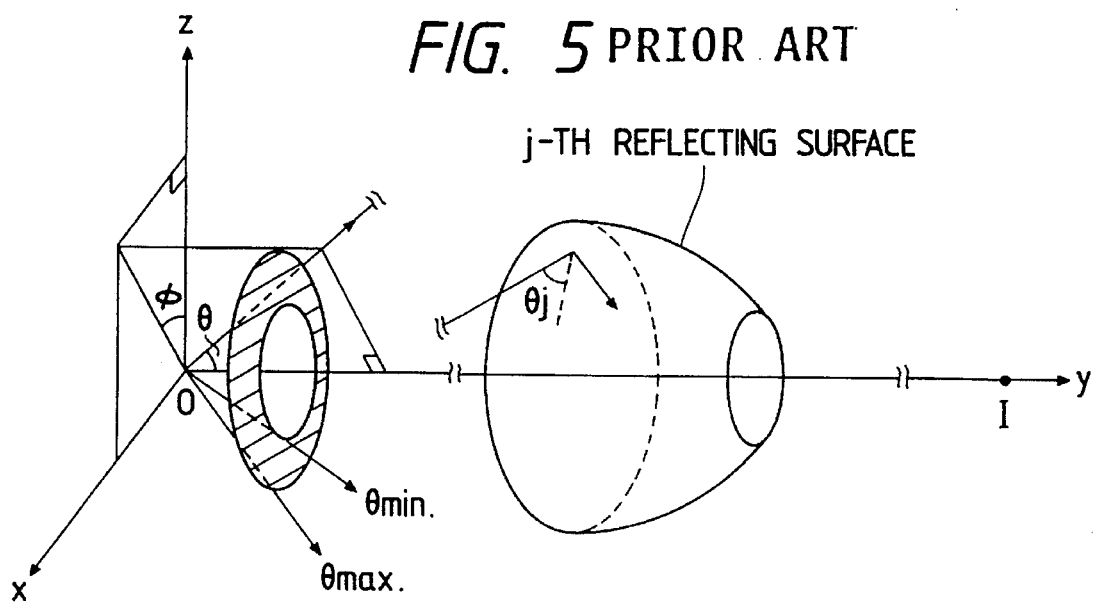
FIG. 5 is a schematic view of the reflection type imaging optical system comprising mirrors of the number of n, coated with the multilayer films.
Figure 6:
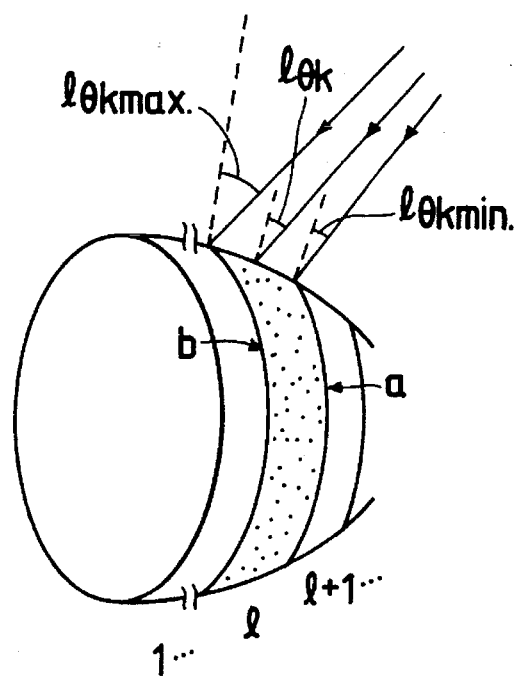
FIG. 6 is a view showing incident angle of light rays incident on a given zone of a reflecting surface of a given reflecting mirror.

Lamination procedure: Like the lamination shown in FIG. 4A, a pair of layers comprising a substance A of a thickness $d_1$ and a substance B of a thickness $d_2$ is laminated in turn in a direction normal to the mirror surface.

Wavelength of light emanating from the object point: α=39.8 Å

Constitutent substances: Ni—Sc

Respective complex indices of refraction are cited as optical constants from Henke's table (B. Henke, atomic data and nuclear data tables 27 (1982)) as follows:

$\tilde{n}_{Ni}$=0.9882−0.0041183i, $\tilde{n}_{Sc}$=0.9975−0.0005738i

Total number of layers: 100 pairs of layers

Embodiment 1

Each reflecting surface of a first reflecting mirror 1 and a second reflecting mirror 2 is divided into two zones, and angles at which the light emanating from the object point O is incident on individual zones are defined as follows:

First reflecting mirror; first zone 1.5°~2.5°; second zone 2.5°~3.5°

Second reflecting mirror; first zone 4°~6°; second zone 6°~9.5°

When layer thicknesses are optimized so that the maximum reflectance is effected with respect to the preceding wavelength at the angles included in the incident angles on individual zones, thicknesses $d_1$ and $d_2$ of Ni and Sc are attained as listed below.

|  | Incident angle providing the max. reflectance, $l_{\Theta k}$ | Layer thickness | |
|---|---|---|---|
|  |  | $d_1$ (Å) | $d_2$ (Å) |
| 1st reflect. mirror; 1st zone | 2° | 8.210 | 11.81 |
| 1st reflect. mirror; 2nd zone | 3° | 8.218 | 11.83 |
| 2nd reflect. mirror; 1st zone | 5° | 8.035 | 12.05 |
| 2nd reflect. mirror; 2nd zone | 8° | 8.288 | 11.93 |

Figure 8:
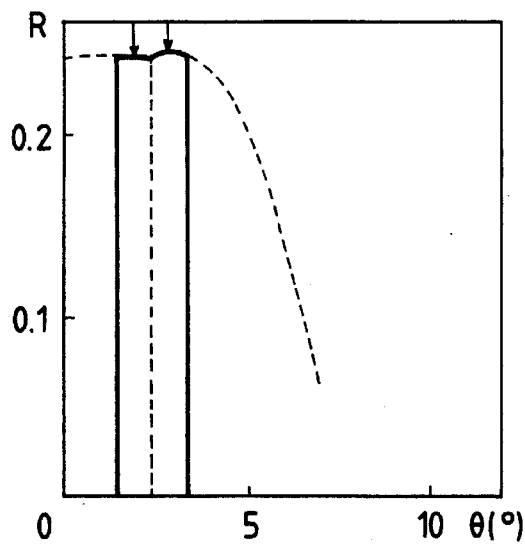
FIGS. 8 and 9 are diagrams showing the distribution of reflectances to incident angles of a first reflecting mirror and a second reflecting mirror of Embodiment 1, respectively.
Figure 9:
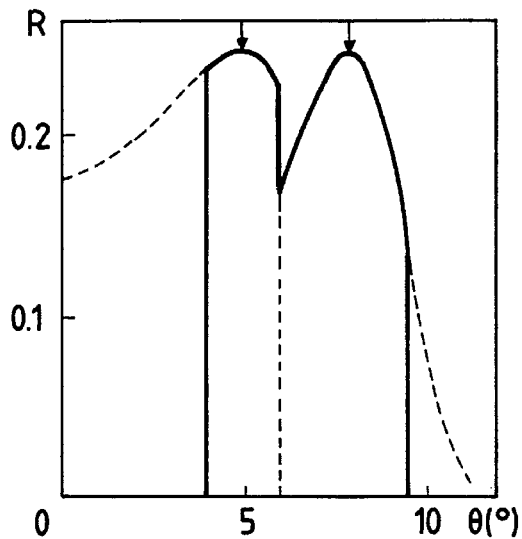

The distribution of the reflectance to the incident angle in this case is as shown in FIG. 8 with regard to the first reflecting mirror 1 and in FIG. 9 with regard to the second reflecting mirror 2.

Where the foregoing multilayer films are applied, the brightness on the image surface, namely, the total transmittance $\alpha$ is 0.00567·Ie.

Embodiment 2

The reflecting surface of the first reflecting mirror 1 is divided in the same manner as in Embodiment 1 to be coated with the multilayer film and that of the second reflecting mirror 2 is divided into three zones for coating of the multilayer film in the following specification.

|  | Incident angle on zone | Incident angle providing the max. reflectance, $l_{\Theta k}$ | Layer thickness | |
|---|---|---|---|---|
|  |  |  | $d_1$(Å) | $d_2$ (Å) |
| 2nd reflect. mirror 1st zone | 4° ≈ 5° | 5° | 8.035 | 12.05 |
| 2nd reflect. mirror 2nd zone | 5° ≈ 7° | 6° | 8.049 | 12.07 |
| 2nd reflect. mirror 3rd zone | 7° ≈ 9.5° | 8° | 8.288 | 11.93 |

Figure 10:
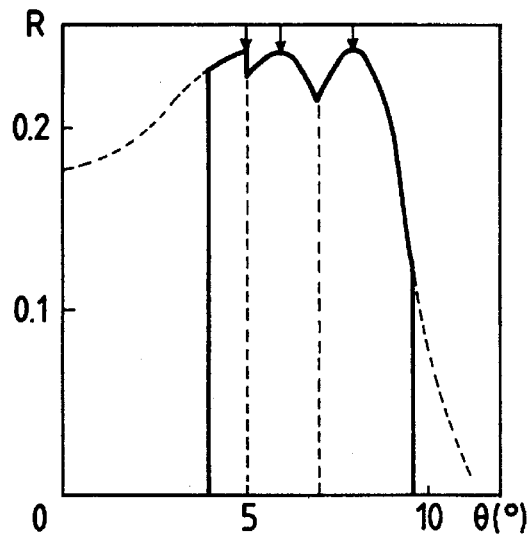
FIGS. 10 and 11 are diagrams showing the distribution of reflectances to incident angles of second reflecting mirrors of Embodiments 2 and 3, respectively.

The distribution of the reflectance to the incident angle of the second reflecting mirror 2 is as shown in FIG. 10.

In this case, the total transmittance $\alpha$ on the image surface comes to 0.00591·Ie.

Embodiment 3

The reflecting surface of the first reflecting mirror 1 is divided in the same manner as in Embodiment 1 to be coated with the multilayer film and that of the second reflecting mirror 2 is divided into five zones for coating of the multilayer film in the following specification.

|  | Incident angle on zone | Incident angle providing the max. reflectance, $l_{\Theta k}$ | Layer thickness | |
|---|---|---|---|---|
|  |  |  | $d_1$(Å) | $d_2$ (Å) |
| 2nd reflect. mirror 1st zone | 4° ≈ 5° | 5° | 8.035 | 12.05 |
| 2nd reflect. mirror 2nd zone | 5° ≈ 6° | 6° | 8.049 | 12.07 |
| 2nd reflect. mirror 3rd zone | 6° ≈ 7.5° | 7° | 8.066 | 12.10 |
| 2nd reflect. mirror 4th zone | 7.5° ≈ 8.5° | 8° | 8.288 | 11.93 |
| 2nd reflect. mirror 5th zone | 8.5° ≈ 9.5° | 8.5° | 8.299 | 11.94 |

Figure 11:
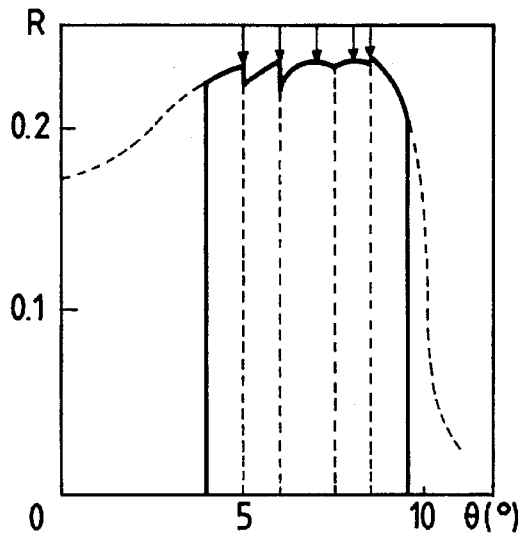

The distribution of the reflectance to the incident angle of the second reflecting mirror 2 is as shown in FIG. 11.

In this case, the total transmittance $\alpha$ on the image surface comes to 0.00614·Ie.

From the foregoing, it has been found that if each reflecting surface is divided into an infinite number of zones to be coated with an optimized design multilayer film, the most brightest image surface will be brought about.

Here, when all of the light beams emanating isotropically from the object point O are divided into light of ($10^2 \times 10^5$) beams having solid angles $\Delta\Omega$ equal to each other, the light of ($10^2 \times 37$) beams, among these beams, traverses an effective aperture of the optical system. If it is assumed that such traversing beams are reflected from each reflecting surface with the maximum reflectance, the total transmittance $\alpha$ in this case is as follows:

$\alpha = 0.00632 \cdot Ie$.

Comparative example

Individual reflecting surfaces are not divided into zones and therefor coated with uniform multilayer films of the following specification.

|  | Incident angle | Incident angle providing the max. reflectance, $l_{\theta k}$ | Layer thickness | |
|---|---|---|---|---|
|  | on zone |  | $d_1$(Å) | $d_2$ (Å) |
| 1st reflect. mirror | 1.5° ≈ 3.5° | 2.8° | 8.014 | 12.02 |
| 2nd reflect. mirror | 4.0° ≈ 9.5° | 7.4° | 8.276 | 11.91 |

Figure 12:
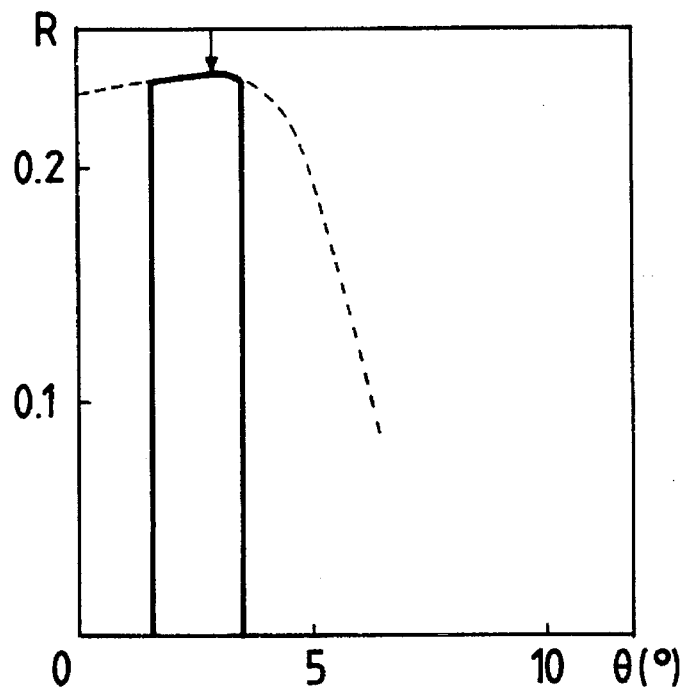
FIGS. 12 and 13 are diagrams showing the distribution of reflectances to incident angles of a first reflecting mirror and a second reflecting mirror of Comparative example, respectively.
Figure 13:
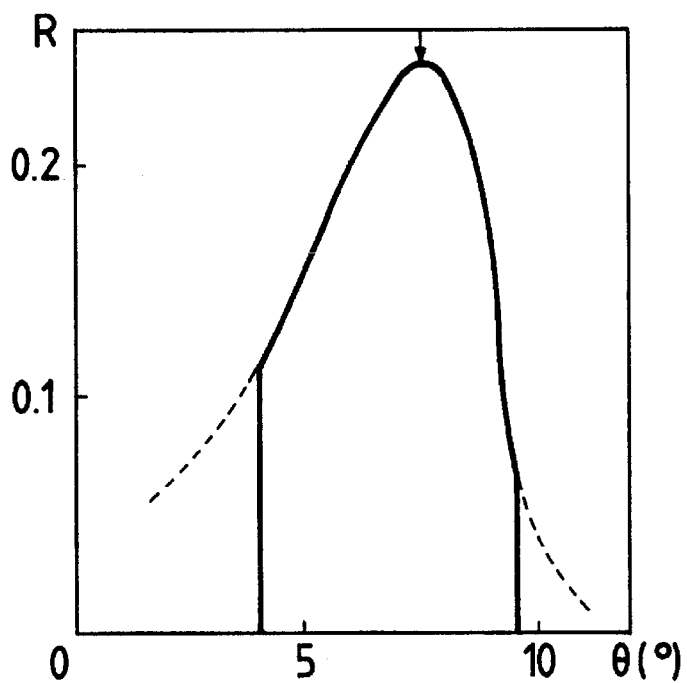

The distribution of the reflectance to the incident angle of the first reflecting mirror 1 is as shown in FIG. 12 and that of the second reflecting mirror 2 in FIG. 13.

In this case, the total transmittance $\alpha$ on the image surface is 0.00499·Ie.

What is claimed is:

1. A Schwarzschild type optical system for converging light emanating from an object point at a predetermined position, comprising:

a concave mirror having an aperture at a center portion thereof, said aperture including an optical axis of said optical system; and a convex mirror disposed to face said aperture of said concave mirror;

each of said concave mirror and said convex mirror including a reflecting surface divided into a plurality of zone areas in a direction across said reflecting surface and which surround said optical axis, and each of said plurality of zone areas differing in spectral reflectance from all others of said plurality of zone areas.

2. A Schwarzschild type optical system for converging light emanating from an object point at a predetermined position, comprising:

a concave mirror having an aperture at a center portion thereof, said aperture including an optical axis of said optical system; and a convex mirror disposed to face said aperture of said concave mirror;

each of said concave mirror and said convex mirror including a reflecting surface divided into a plurality of zone areas in a direction across said reflecting surface, which surround said optical axis; each of said plurality of zone areas differing in a spectral reflectance from all others of said plurality of zone areas; and each of said concave mirror and said convex mirror being constructed so that light of a particular wavelength, impinging upon one of said plurality of zone areas, has a maximum reflectance at an angle of incidence between a minimum and a maximum value.

3. A reflection type imaging optical system according to claim 1 or 2, wherein said plurality of zone areas are partitioned by interfaces and said interfaces configure concentric circles with said optical axis at a center thereof.

4. A reflection type imaging optical system comprising:
   at least one reflecting mirror for converging light emanating from an object point at a predetermined position; and
   a reflecting surface on said reflecting mirror divided into a plurality of reflecting surface areas in a direction across said reflecting surface, each of said plurality of reflecting surface areas reflecting light incident toward a respective one of said plurality of reflecting surface areas differently than the others of said plurality of reflecting surface areas;
   each of said plurality of reflecting surface areas being shaped into an annular form surrounding an optical axis of said imaging optical system, each of the plurality of annular-shaped areas having a consistent reflectivity through a 360° angle about said optical axis, and said consistent reflectivity being different for each of said plurality of annular-shaped areas; and
   said reflecting mirror being constructed so that light, of a particular wavelength, impinging upon one of said plurality of reflecting surface areas, has a maximum reflectance at an angle of incidence between a minimum and a maximum value.

5. A reflection type imaging optical system according to claim 4, wherein said reflecting surface is a multilayer film formed into said plurality of reflecting surface areas different in spectral reflectance from each other.

6. A reflection type imaging optical system according to claim 5, wherein said multilayer film is a plurality of layers of substances each having predetermined thicknesses and laminated alternately on a substrate.

7. A reflection type imaging optical system according to claim 5, wherein said substances constituting said multilayer film of said plurality of reflecting surface areas are comprised of a same substance, and thicknesses of said plurality of layers of substances vary with each of said plurality of reflecting surface areas.

8. A Schwarzschild type optical system for converging light emanating from an object point at a predetermined position, comprising:
   a concave mirror having an aperture at a center portion thereof, said aperture including an optical axis of said optical system; and
   a convex mirror disposed to face said aperture of said concave mirror;
   each of said concave mirror and said convex mirror including a reflecting surface divided into a plurality of zone areas which surround said optical axis, and each of said plurality of zone areas differing in spectral reflectance from all others of said plurality of zone areas; and
   a number of said plurality of zone areas of said reflecting surface of said convex mirror is larger than a number of said plurality of zone areas of said reflecting surface of said concave mirror.

9. A Schwarzschild type optical system for converging light emanating from an object point at a predetermined position, comprising:
   a concave mirror having an aperture at a center portion thereof, said aperture including an optical axis of said optical system; and
   a convex mirror disposed to face said aperture of said concave mirror;
   each of said concave mirror and said convex mirror including a reflecting surface divided into a plurality of zone areas, which surround said optical axis;
   each of said plurality of zone areas differing in a spectral reflectance from all others of said plurality of zone areas; and
   each of said concave mirror and said convex mirror being constructed so that light of a particular wavelength, impinging upon one of said plurality of zone areas, has a maximum reflectance at an angle of incidence between a minimum and a maximum value.

10. A reflection type imaging optical system comprising:
    at least one reflecting mirror for converging light emanating from an object point at a predetermined position; and
    a reflecting surface on said reflecting mirror divided into a plurality of reflecting surface areas in a direction across said reflecting surface, each of said plurality of reflecting surface areas reflecting light incident toward a respective one of said plurality of reflecting surface areas differently than the others of said plurality of reflecting surface areas;
    said reflecting surface being a multilayer film formed into said plurality of reflecting surface areas different in spectral reflectance from each other.

11. A reflection type imaging optical system according to claim 10, wherein said multilayer film is a plurality of layers of substances each having predetermined thicknesses and laminated alternately on a substrate.

12. A reflection type imaging optical system according to claim 11, wherein said substances constituting said multilayer film of said plurality of reflecting surface areas are comprised of a same substance, and thicknesses of said plurality of layers of substances vary with each of said plurality of reflecting surface areas.

13. A reflection type imaging optical system comprising:
    at least one reflecting mirror for converging light emanating from an object point at a predetermined position; and
    a reflecting surface on said reflecting mirror divided into a plurality of reflecting surface areas in a direction across said reflecting surface, each of said plurality of reflecting surface areas reflecting light incident toward a respective one of said plurality of reflecting surface areas differently than the others of said plurality of reflecting surface areas;
    each of said plurality of reflecting surface areas being shaped into an annular form surrounding an optical axis of said imaging optical system, each of the plurality of annular-shaped areas having a consistent reflectivity through a 360° angle about said optical axis, and said consistent reflectivity being different for each of said plurality of annular-shaped areas.

* * * * *